(12) United States Patent
Weiss et al.

(10) Patent No.: US 7,196,288 B2
(45) Date of Patent: Mar. 27, 2007

(54) FLEXIBLE HEATING ELEMENT

(75) Inventors: Michael Weiss, Benediktbeuren (DE); Stefan Ultsch, Staefa (CH)

(73) Assignee: W.E.T. Automotive Systems AG (DE)

( * ) Notice: Subject to any disclaimer, the term of this patent is extended or adjusted under 35 U.S.C. 154(b) by 307 days.

(21) Appl. No.: 10/762,426

(22) Filed: Jan. 22, 2004

(65) Prior Publication Data

US 2004/0173594 A1 Sep. 9, 2004

(30) Foreign Application Priority Data

Feb. 5, 2003 (DE) ................. 103 04 761

(51) Int. Cl.
*H05B 1/00* (2006.01)
(52) U.S. Cl. ............... 219/217; 219/541; 219/543
(58) Field of Classification Search ............... 219/217, 219/528, 529, 532, 542, 545, 549; 338/208, 338/328
See application file for complete search history.

(56) References Cited

U.S. PATENT DOCUMENTS

| 4,538,054 | A | * | 8/1985 | de la Bretoniere | .......... 219/545 |
| 4,616,125 | A | | 10/1986 | Oppitz | |
| 5,002,336 | A | | 3/1991 | Feher | |
| 5,298,722 | A | * | 3/1994 | Tanaka | ........................ 219/545 |
| 5,723,845 | A | * | 3/1998 | Partington et al. | .......... 219/217 |
| 5,824,996 | A | * | 10/1998 | Kochman et al. | ........... 219/529 |
| 5,849,137 | A | | 12/1998 | Hogge et al. | |
| 6,057,530 | A | * | 5/2000 | Gurevich | ..................... 219/529 |
| 6,229,123 | B1 | * | 5/2001 | Kochman et al. | ............ 219/549 |
| 6,713,733 | B2 | * | 3/2004 | Kochman et al. | ............ 219/549 |

FOREIGN PATENT DOCUMENTS

DE 1 993 174 U 9/1968

* cited by examiner

*Primary Examiner*—Monica S. Carter
*Assistant Examiner*—Vinod Patel (57) ABSTRACT

A flexible heating element for a vehicle seat or the like includes at least one flexible heating resistor element and at least two flexible supply electrodes arranged at a distance from each other and at least partly embedding the heating resistor element between them to form a layered structure. The flexible heating resistor is formed of a material having a positive temperature coefficient (PTC) effect. The layered structure includes a plurality of recesses formed therein defining a plurality of webs, the webs and recesses resulting in a net-like structure.

14 Claims, 5 Drawing Sheets

FLEXIBLE HEATING ELEMENT

TECHNICAL FIELD

The present invention relates to a heating device and, more particularly concerns a flexible heating element for a vehicle seat or vehicle contact surface.

BACKGROUND OF THE INVENTION

Heating elements such as those disclosed in U.S. Pat. No. 4,616,125 or U.S. Pat. No. 5,849,137 include two conductive films embedding a positive temperature coefficient (PTC) layer between them. Heating elements comprising conductive films are not very air-permeable and lack flexibility.

U.S. Pat. No. 5,002,336 discloses a seat with air conditioning means. It has an air-distributing layer made up of spiral springs. The air conditioning of the seat, however, is based on feeding fully conditioned air into the air distributing layer and distributing it uniformly in the seat. Such a system is bulky and lacks the ability to accurately and rapidly heat or condition the seating surface.

DE 1,993,174 discloses a heating element whose heating conductor is composed of film segments arranged in a labyrinth-fashion. In that case, the current heats by conventional resistance heating, while it flows labyrinth-fashion along the plane of the heating elements. Such heating elements are not very air-permeable and require an external temperature-regulating means.

Accordingly, there exists a need for an improved areal heating element that is highly flexible, air permeable, robust and responsive.

SUMMARY OF THE INVENTION

The present invention provides a heating element comprising at least one flexible heating resistor and at least two flexible electrodes arranged at a distance from each other and at least partially embedding the heating resistor between them. The electrodes are arranged such that current flow is directed essentially parallel to the vertical extent of the layered heating element. Both the heating resistor and the electrodes include a plurality of recesses formed therein in the direction of the vertical extent of the layered heating element. The heating element is advantageous in that it is mechanically robust and air-permeable.

The plurality of recesses can form a plurality of webs. The recesses of the various layers can be arranged congruently such that the resulting layered structure forms a net-like structure. The webs can also be stretched in at least one direction perpendicular to the vertical extent of the layered structure. This arrangement of the heating element is advantageous in that it comprises little material and is space efficient.

The heating resistor can comprise a positive temperature coefficient (PTC) material such that it limits the effective temperature range of the heating element. Some examples of temperature ranges include 35° to 90° C., 60° to 90° C. and 70° to 80° C. This embodiment has the advantage of being self-regulating.

The heating element can also include a contacting mechanism with at least two supply conductors arranged at different sides of the heating element with regard to the vertical extent of the layered structure. The supply conductors can be arranged in parallel or at substantially uniform mean intervals. This embodiment has robust electrical contacts.

The flexible heating element is adaptable to use in vehicle seats, steering wheels or other interior surfaces of the vehicle contacting or being contacted by, a vehicle occupant. The heating element may also advantageously be incorporated into a plastic such as the upholstery cushion of a vehicle seat whether the upholstery cushion is foam or cast. In this way, the heating element can act as an independent functional module within the overall seating system.

The present heating element may also be used in an air-conditioned vehicle seat. Because the heating element includes recesses, it can be arranged such that it is traversed by a stream of air, including a non-uniform stream of air, from an air conditioning system, i.e., a fan or a blower. This embodiment makes possible a uniform tempering of surfaces in contact with the occupant dispute unlike cooling tendencies.

In another embodiment, the heating element can be applied to an air-transmissive spacer layer within a vehicle seat. For example, it may be laminated to the spacer layer which may be a knotted fabric or coil springs within the seat. This embodiment also provides a lightweight, compact functional module for vehicle seating systems.

The present invention itself, together with further objects and attendant advantages, will be best understood by reference to the following detailed description, taken in conjunction with the accompanying drawing.

BRIEF DESCRIPTION OF THE DRAWINGS

For a more complete understanding of this invention reference should now be had to the embodiments illustrated in greater detail in the accompanying figures and described below by way of examples of the invention wherein.

DETAILED DESCRIPTION OF THE INVENTION

In the following figures, the same reference numerals are used to refer to the same components. While the present invention is described as a heating element for use within a vehicle seating system, it may be adapted and applied to various systems including steering wheel systems or other vehicle or non-vehicle systems requiring a heated tactile surface. In this regard, in the following description, various operating parameters and components are described for several constructed embodiments. These specific parameters and components are included as examples only and are not meant to be limiting.

Figure 1:
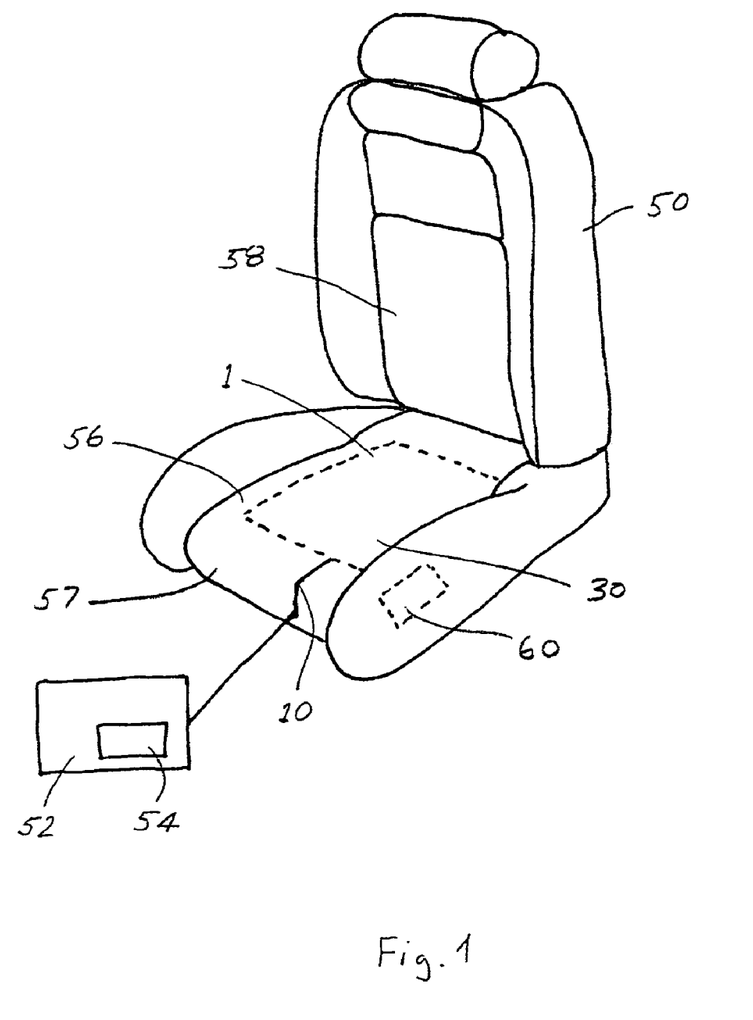
FIG. 1 is a perspective and block diagrammatic view of a vehicle seat system incorporating a heating element in accordance with an embodiment of the present invention.

Referring now to FIG. 1, a perspective and block diagrammatic view of a vehicle seat 50 incorporating a heating element 1 according to an embodiment of the present invention is shown. The heating element 1 is electrically coupled to a controller 52 including a power source 54 by way of a connector which may be a contacting member 10 as described in more detail below. In this example, electrical power is transferred to the heating element 1 to warm an upper surface 56 of the seat cushion 57 of the seat 50. Of course, another heating element 1 could also be incorporated into the backrest 58 to similarly warm that portion of the seat 50 as well. As shown, the heating element 1 is contained within a seat cover 30 and is beneath and near the upper surface 56 to provide efficient transfer of thermal energy from the heating element 1 to the upper surface 56. The heating element 1 could also be incorporated into other portions of the seat cushion, as described below, and the seat system 50 could also include a fan or blower 60 electrically coupled to the controller 52 for directing air across the heating element 1 towards the upper surface 56. A similar arrangement could also be included in the backrest 58.

Figure 2:
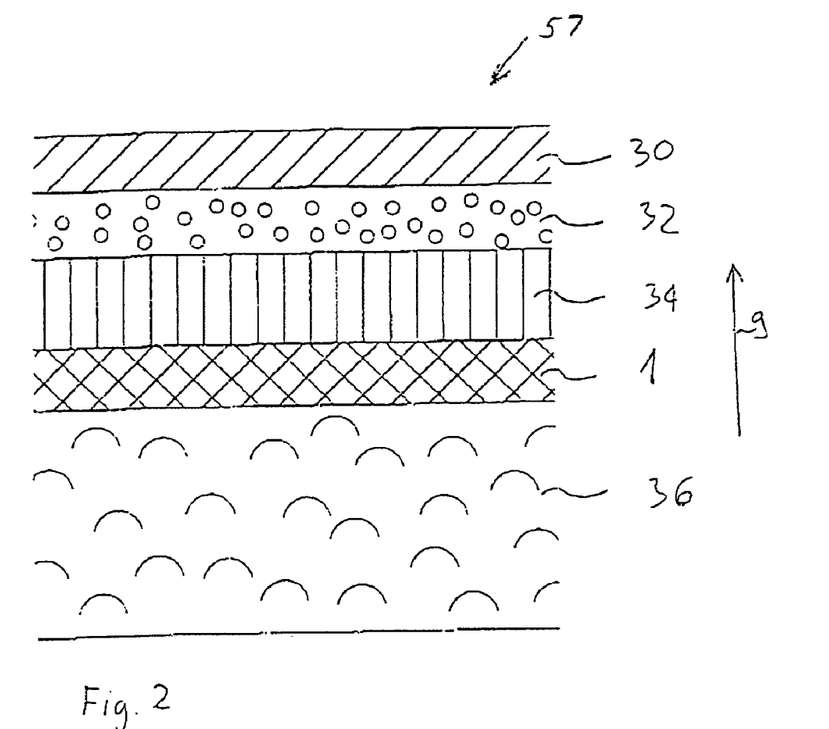
FIG. 2 shows a cross-section of an example of application for an areal heating element in accordance with the present invention.

FIG. 2 shows a portion of a cross-section of a seat cushion 57 incorporating an areal, flexible heating element 1 according to the present invention. The heating element 1 is integrated in the upholstery of the seat. In this case, the heating element 1 is arranged on a core pad 36. The core pad 36 is generally of foam material. The core pad can be either cast or foam. The heating element 1 is covered with an intermediate padding 34, a so-called "foam backing" 32 arranged over the intermediate padding 34, and a covering material 30. The covering material 30 is usually fabric or leather, and may be perforated to aid in conveying air toward, or away from, the passenger. A heating element so arranged will heat surfaces in contact with a user rapidly and with low energy outlay.

Figure 3:
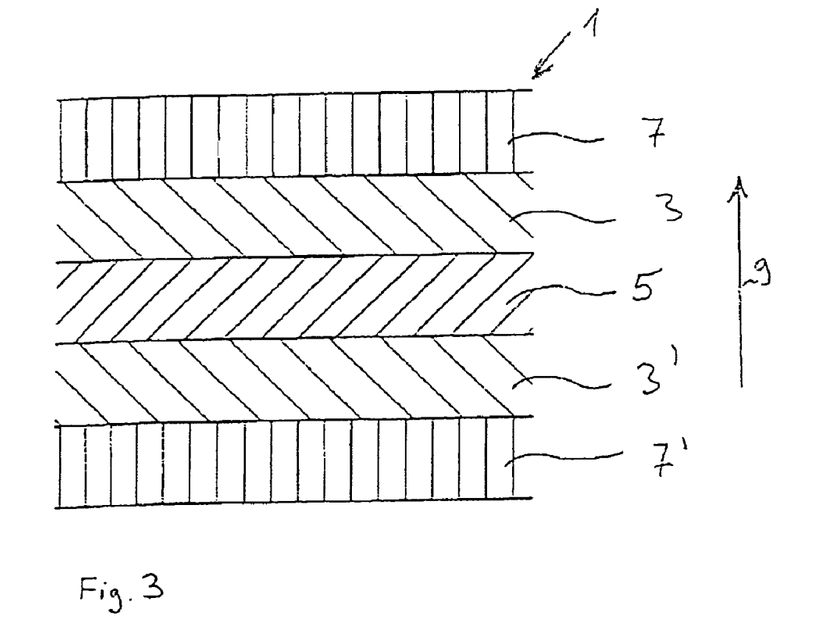
FIG. 3 shows a cross-section of a first embodiment, by way of example, of a heating element according to the present invention.

FIG. 3 shows an embodiment of the heating element 1 in enlarged cross-section. The heating element 1 is thin-layered. As used herein, the term "thin-layered" means that the object, compared to its other dimensions, has a small thickness in the direction of its vertical extent 9. In the present embodiment by way of example, the heating element is about 1 mm in thickness.

The heating element 1 comprises a thin-layered electrical heating resistance element 5. The heating resistance element layer is about 0.5 to 1.0 mm thick. The heating resistance element 5 is made up at least in part of a positive temperature coefficient (PTC) material. A PTC material exhibits a higher specific electrical resistance at high temperatures than at lower temperatures. In particular, when the electric heating resistance element 5 is connected to an electric potential, a certain temperature cannot be exceeded, because the specific resistance of the heating resistance 5 will approach infinity. The PTC material may for example be a polymer treated with carbon black particles.

On the areal heating resistance element 5, areal, thin-layered supply electrodes 3, 3' are arranged, and can essentially cover over the resistance element 5. The supply electrodes 3, 3' are arranged on mutually opposed sides of the heating resistance element 5, and at the same time substantially cover the same area such that they substantially cover each other. They thereby essentially embed the heating resistance element 5 between them. The supply electrodes 3, 3' are so arranged that in operation, they make possible a flow of electric current essentially over the entire area of the heating resistance element 5, which flow is directed essentially parallel to the vertical extent 9 of the layer. The supply electrodes 3, 3' have a thickness of about 10 to 50μ, more specifically about 20μ. They have a substantially higher specific conductivity than the material of the heating resistance element 5.

At least one, and advantageously all of the supply electrodes 3, 3' are made up of an electrically conductive textile. Suitable materials include knotted, woven, knitted and fleeced fabrics. Metallic fibers or synthetic fibers with metallic coating are particularly suitable for this purpose. They form a large area of contact between the electric heating resistance element 5 and the supply electrodes 3, 3'. Alternatively, at least one and advantageously all of the supply electrodes 3, 3' are made up of a metallic or metallically coated film. The films can have a microtextured, enlarged surface area from a suitable pretreatment as is known in the art.

The supply electrodes 3, 3' are in integral material connection with the heating resistance element 5. This may, for example, be accomplished by bonding, galvanizing, vapor deposition, laminating or other known processes.

The heating element 1 can also include at least one covering layer 7, 7' with which at least one of the supply electrodes 3, 3' is shielded from the environment. For example, the heating element 1, as shown, is protected on both sides (with respect to its vertical extent 9) by covering layers 7, 7' from chemically aggressive or electrically conductive components of the surroundings. The covering layers 7, 7' may cover over the full area of the heating element 1. Alternatively, provision may be made so that the recesses 22 described below are not overlapped by the covering layer 7.

The covering layers 7, 7' have a thickness of about 40μ. They are made up of polyethylene or polypropylene, for example. Materials of high tearing strength are serviceable and desirable for the covering layers 7, 7'. In particular, the selection of pre-stressed, including doubly pre-stressed, films may be useful.

Each of the layers, i.e., the supply electrodes 3, 3' and the electric heating resistance element 5, and even the covering layers 7, 7' may be the same or different colors. Differential coloration makes possible good visual recognition of the electric contact areas. Like coloration causes the heating element to appear as a homogeneous configuration.

Figure 4:
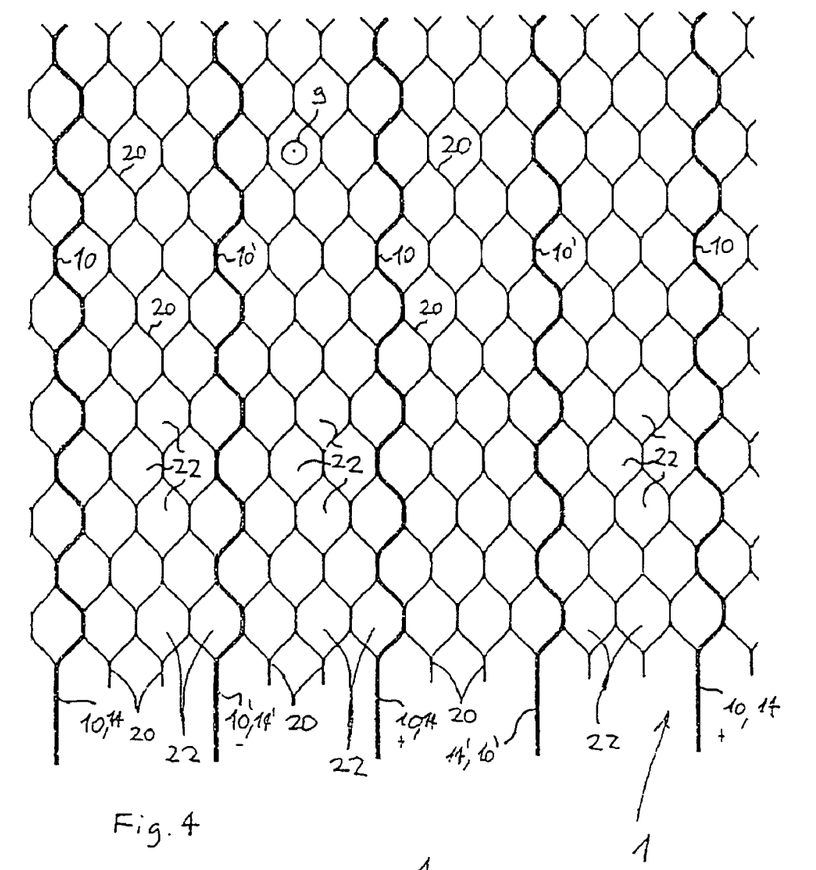
FIG. 4 shows a top view of a second embodiment by way of example, of a heating element according to the present invention.

FIG. 4 shows a top view of an embodiment by way of example of the heating element 1. The heating element 1 is provided with a plurality of recesses 22. These recesses 22 penetrate at least the heating resistance element 5 and the supply electrodes 3, 3'. The direction of penetration here corresponds essentially to the vertical extent 9 of the layer. Owing to the multitude of recesses 22, a plurality of webs 20 are formed between them. The webs 20 are so connected to each other that the heating element 1 assumes a net-like texture.

The recesses 22 are arranged such that essentially the entire material of the penetrated layers 3, 3', 5 remains in the form of webs 20 in the heating element 1. In other words, the openings 22 are aligned in the several layers to create a net-like structure for the resulting heating element 1.

The heating element 1 also has a contacting members 10. The contacting members 10 comprise at least two, preferably a plurality, of supply conductors 14 running more or less parallel to each other. The supply conductors 14 have a substantially higher specific electrical conductivity than the resistance element 5, and can also have a higher specific electrical conductivity than the supply electrodes 3, 3'. The contacting members 10 comprise, for example, carbon and/or steel fibers. They can be extruded during the production of the composite of supply electrodes 3, 3' and heating resistance element 5. In this way, an enlarged contact area is formed between the supply conductors 14 and the supply electrodes 3, 3'.

The supply conductors 14, 14' sweep at least a portion of the heating element 1, and can sweep essentially the entire heating element 1, in at least one direction of extent of the heating element plane. Thus, they are electrically conductively connected, linearly or at a multitude of points, with the heating element 1 and, in particular, with the supply electrodes 3, 3'.

The supply conductors 14, 14' can be arranged at more or less uniform intervals from each other. In the example of FIG. 4, two neighboring supply conductors 14, 14' are each arranged on different sides of the heating element 1 (with respect to the vertical extent 9 of the layer) to contact supply electrodes 3, 3' different from each other. The supply conductors 14, 14' may expediently be already attached to the heating element 1 before the recesses 22 are introduced and the heating element 1 is stretched. The supply conductors 14, 14' may expediently be covered at least in large part by the covering layers 7, 7'.

To produce the present heating element 1, two supply electrodes 3, 3' are first connected to the electric heating resistance element 5 to form an areal, layered structure. In this layered structure, recesses 22 are then punched. These can be in the form of lineal slits.

After introduction of the recesses 22, the heating element 1 is stretched. The stretching takes place perpendicular to the lengthwise orientation of the recesses 22. As a result, the first linear recesses 22 are widened to honeycomb-like openings. If a correspondingly great deformation takes place, the change of shape will be lasting. In other words, the heating element 1 will plastically deform to some extent to retain a net-like or honeycomb structure. After stretching, the heating element 1 also exhibits a directional texture.

The stretching takes place in at least one direction perpendicular to the vertical extent 9 of the layer. A stretch in two directions is likewise contemplated. This may, for example, be expedient to produce different zones with different heat output due to different mesh size of the grid network. Thus, the resulting mesh structure can have a higher density in some areas as compared to other areas due to additional localized stretching.

The recesses 22 are worked such that the webs 20 remaining between them in the initial state exhibit a width of about 0.1–2.0 mm, and in the later stretched state, a width of about 0.2–2.0 mm. Alternatively, the width of the webs may be greater. During stretching, however, the webs 20 may rise due to twisting in the direction of vertical extent. This may be undesirable in some applications. The length of the slits forming the recesses should be modified to avoid any undesirable raising of the webs 20 during stretching.

The recesses 22 can be of more or less equal length. In the unstretched state, they can be about 1.0–3.0 cm, such as 2.0 cm, in length. The mutually neighboring recesses 22 in the unstretched state are offset by about ¼ to ¾ of their length, and preferably about half their length, from each other. The offset takes place along the lengthwise axis of the recesses, or perpendicular to the direction of stretch and parallel to the plane of the heating element. Of course, the length of the recesses 22, or their distances from each other in a heating element, can be different. In this way, zones of non-uniform heat density can be established.

The heating element 1 is about 2 to 20 times longer in the stretched condition than in the unstretched condition. Depending upon the recess configuration, suitable ratios may include 5 to 15 times longer and, in particular, 10 times longer in the stretched state.

The heating element in the unstretched condition exhibits a thickness of about 1.0 mm. This thickness varies only slightly with stretching although, as mentioned above, some heightening may occur during stretching.

Figure 5:
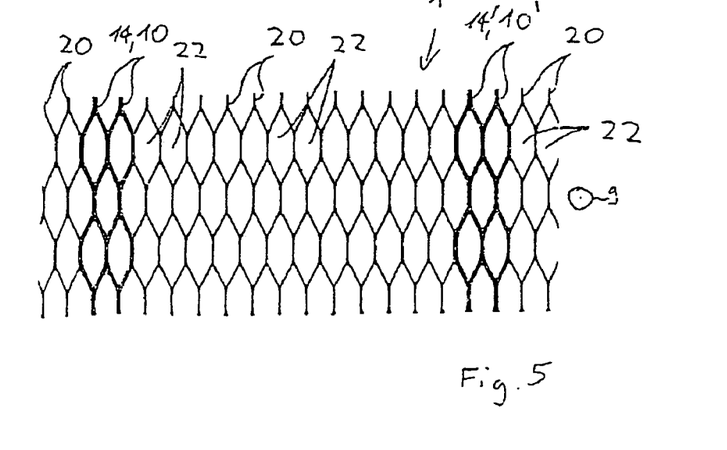
FIG. 5 shows a top view of a third embodiment by way of example, of a heating element according to the present invention.

FIG. 5 shows a heating element essentially similar to that of FIG. 4. However, the heating element of FIG. 5 includes supply conductors 14, likewise provided with recesses 22. As a result, each supply conductor 14 will straddle several webs 20 arranged side by side. This ensures a secure current input, even in case of failure of an individual web 20.

Figure 6:
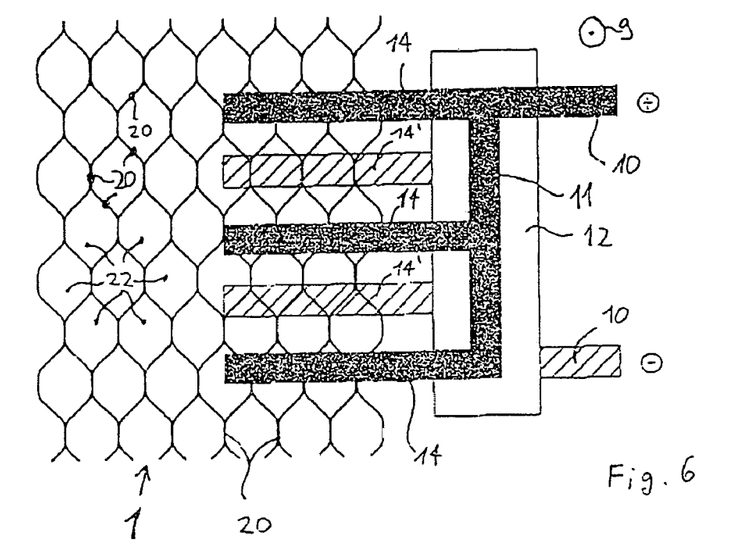
FIG. 6 shows a top view of a contacting area of a fourth embodiment of a heating element according to the present invention.
Figure 7:
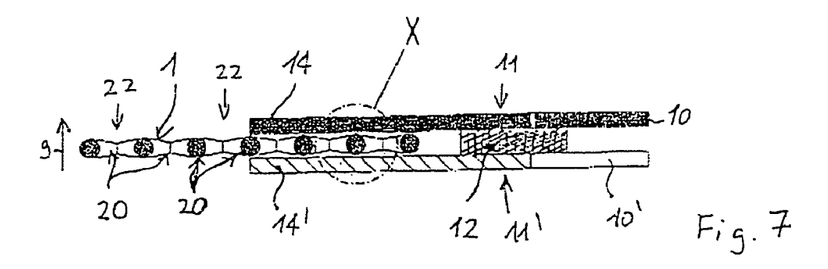
FIG. 7 shows a cross-section of a contacting area according to FIG. 6.
Figure 8:
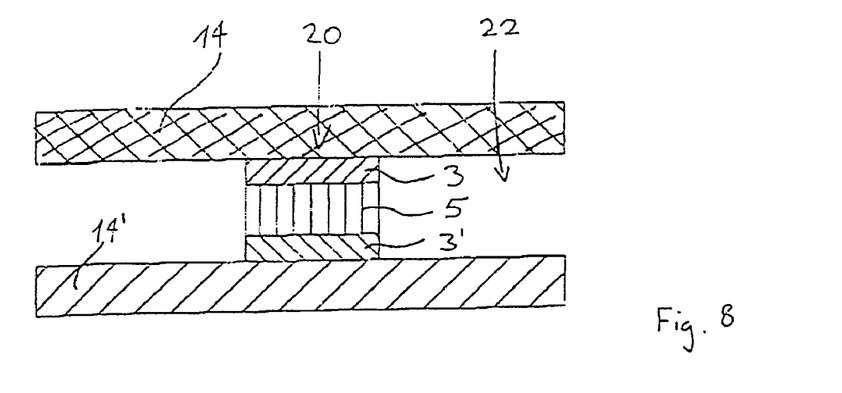
FIG. 8 shows an enlargement of detail X in FIG. 7.

FIGS. 6, 7 and 8 show a heating element with alternative contacting members 10, 10'. In the case of this heating element 1, only the marginal area is electrically contacted. For this purpose, each of the supply conductors 14, 14' associated with a supply electrode 3, 3' is connected to a connection area 11, 11' to form a comb-like structure. The connection area 11 of the supply electrode 3 is arranged to cover over the connection area 11' of the supply electrode 3'. For insulation of the two connection areas 11, 11', an areal insulation element 12 is arranged in between. The supply conductors 14, 14' contact the webs 20 overswept by them pointwise.

The supply conductors 14 associated with the supply electrode 3, as in the previous embodiment by way of example, are arranged offset from the supply conductors 14' of the supply electrode 3'. The contact poles of the contacting member 10, 10' are likewise arranged to not cover over each other, to simplify the contacting.

The web 20 made up of the heating resistance element 5 and the supply electrodes 3 is here clamped between the supply conductors 14, 14', and thus contacted.

In operation, an electric potential is provided on the contacting members 10, 10'. This potential is passed on uniformly to the supply electrodes 3, 3' by way of the supply conductors 14, 14'. The voltage present affects a flow of current through the heating resistance element 5. This flow of current is dependent on the resistance of the heating resistor. The local flow of current thus depends on the local temperature present. In other words, at relatively high current flows, a corresponding increase in temperature occurs, where the process starts from a low temperature. Conversely, when little current flows, little heating is done, when the process starts from a relatively high temperature due to the nature of the PTC material.

Figure 9:
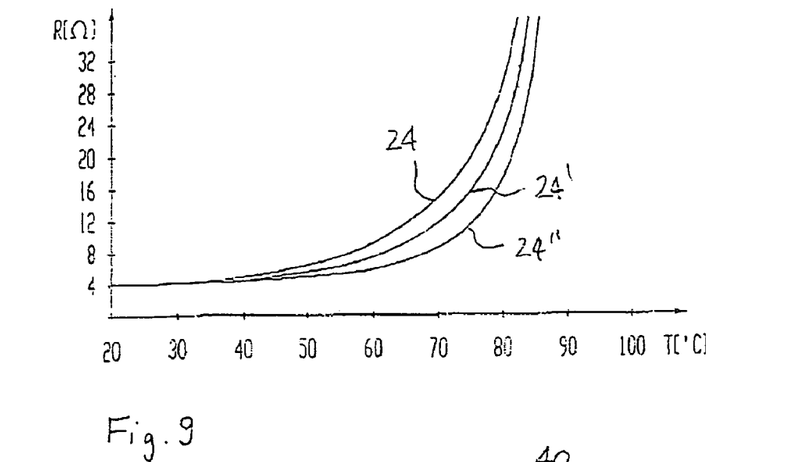
FIG. 9 shows heating curves of various PTC materials which may be used in a heating element according to the present invention.

FIG. 9 shows the relationship between electrical resistance and temperature in the form of heating curves 24, 24', 24" for different PTC materials in the heating resistance element 5. A common feature of all heating curves 24 to 24" is that they exhibit a more or less uniform electrical resistance at lower temperatures. With increasing temperature, the electrical resistance rises. In approaching a material-specific temperature, the specific electrical resistance approaches infinity. For the heating resistance element 5 a material should be selected that already exhibits a relevant resistance gain at temperatures between 40° and 60° C. The maximum attainable temperature value, depending on the application, should be set between 60° and 90° C., such as between 70° and 80° C.

Figure 10:
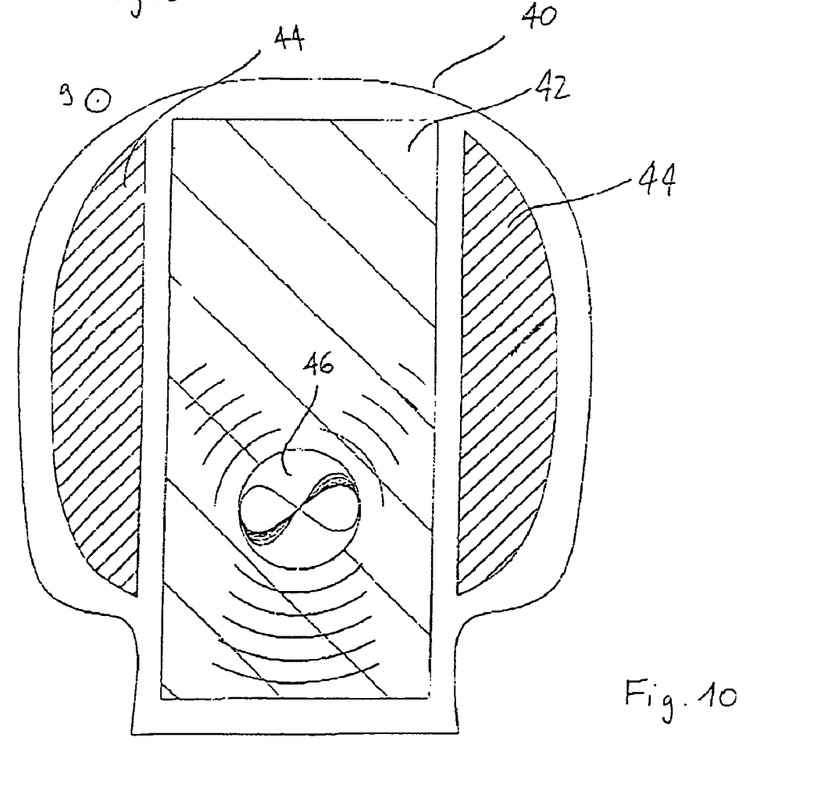
FIG. 10 shows a top view of a seating surface of an air-conditioned seat including a heating element according to the present invention.

FIG. 10 shows a top view of one example of a sitting surface of a seat cushion 40. Just under the sitting surface, the cushion is covered all over with a heating element (not visible). The structure of the seat may, for example, be the same as the embodiment shown in FIG. 1 or FIG. 2.

The sitting surface comprises two areas 42, 44. The area 42 is traversable by air. Here, air is transported through the sitting surface by a blower or fan 46, for example by suction or pressure. In the unventilated area 44, arranged at the margins of the ventilated area 42, the surface of the seat is merely heated. It is not traversed by air.

In the sitting surface of the seat 40, between the ventilated and unventilated areas on the one hand, and, due to non-homogeneous air flows in the ventilated area 42 on the other hand, there results a highly non-uniform cooling of the integrated heating element. Nevertheless, the heating element according to the invention can re-regulate its temperature independently with local adaptation. Thus, more current flows through the heating element parallel to its vertical extent of layer 9 in the more intensely cooled locations. In this way, the already warm areas of the seat do not continue to rise in temperature, whereas the cooler portions of the seating surface continue to warm to the desired temperature setting. A similar arrangement can be constructed in the backrest of the seat, as well.

While the invention has been described in connection with one or more embodiments, it is to be understood that the specific mechanisms and techniques which have been described are merely illustrative of the principles of the invention, numerous modifications may be made to the apparatus described without departing from the spirit and scope of the invention as defined by the appended claims.

What is claimed is:

1. An apparatus comprising:
   at least one flexible heating resistor element and at least two flexible supply electrodes arranged at a distance from each other and at least partly embedding the heating resistor element between them to form a layered structure, the supply electrodes being arranged to permit a flow of current directed essentially parallel to a vertical extent of the layered structure; and
   at least one contacting member including at least two supply conductors electrically coupled to the supply electrodes, the supply conductors spanning the heating resistor element in at least one planar direction of the layered structure, the contacting member being adapted to convey a voltage potential to the supply electrodes by way of the supply conductors,
   wherein the heating resistor element and the supply electrodes each include a plurality of recesses formed therein in the direction of the vertical extent of the layered structure, and wherein the plurality of recesses in the heating resistor element and supply electrodes are congruently arranged to form a plurality of webs, the webs and recesses forming a net-like layered structure.

2. An apparatus according to claim 1 wherein the net-like structure is stretched in at least one direction perpendicular to the vertical extent of the layered structure.

3. An apparatus according to claim 1 wherein the heating resistor element comprises a material having a positive temperature coefficient (PTC) effect.

4. An apparatus according to claim 3 wherein the PTC material limits a temperature range of the heating resistor to between approximately 35. degree. C. and 90. degree. C.

5. An apparatus according to claim 4 wherein the heating resistor element is a carbon black coated polymer, and is approximately 0.5 mm to 1.0 mm thick.

6. An apparatus according to claim 3 wherein the PTC material limits a temperature range of the heating resistor to between approximately 70. degree. C. and 80. degree. C.

7. An apparatus according to claim 1 wherein at least one of the supply electrodes comprises an electrically conductive textile selected from the group consisting of: knotted, woven, knitted or fleeced fabrics.

8. An apparatus according to claim 1 wherein at least one of the supply electrodes comprises a metallic or metallically coated film.

9. An apparatus according to claim 1 wherein the supply electrodes are integrally coupled to the heating resistor element.

10. An apparatus according to claim 1 wherein the supply conductors are arranged essentially parallel on the heating resistor element at uniformly spaced intervals.

11. An apparatus according to claim 1 wherein each supply conductor spans several adjacent webs.

12. An apparatus according to claim 1 wherein the heating resistor element and at least one of the flexible supply electrodes are different colors.

13. An apparatus according to claim 1 comprising a covering layer sealing both sides of the layered structure.

14. An apparatus according to claim 1 wherein the layered structure is coupled to a vehicle seat pad by a seat cover.

* * * * *

UNITED STATES PATENT AND TRADEMARK OFFICE
CERTIFICATE OF CORRECTION

| | | |
|---|---|---|
| PATENT NO. | : 7,196,288 B2 | Page 1 of 1 |
| APPLICATION NO. | : 10/762426 | |
| DATED | : March 27, 2007 | |
| INVENTOR(S) | : Michael Weiss and Stefan Ultsch | |

It is certified that error appears in the above-identified patent and that said Letters Patent is hereby corrected as shown below:

Title Page, item (73) Assignee should read as follows:
-- (73) Assignees: W.E.T. Automotive Systems AG (DE); Huber + Suhner AG (CH) --

In The Claims:
Claim 4, Column 8, Line 17, should read as follows:
-- between approximately 35° C and 90° C. --

Claim 6, Column 8, Line 23, should read as follows:
-- between approximately 70° C and 80° C. --

Signed and Sealed this

Eleventh Day of September, 2007

JON W. DUDAS
*Director of the United States Patent and Trademark Office*